June 2, 1936.　　R. PAXTON ET AL　　2,043,113
METAL ENCLOSED SWITCHGEAR
Filed Sept. 14, 1933　　2 Sheets-Sheet 1
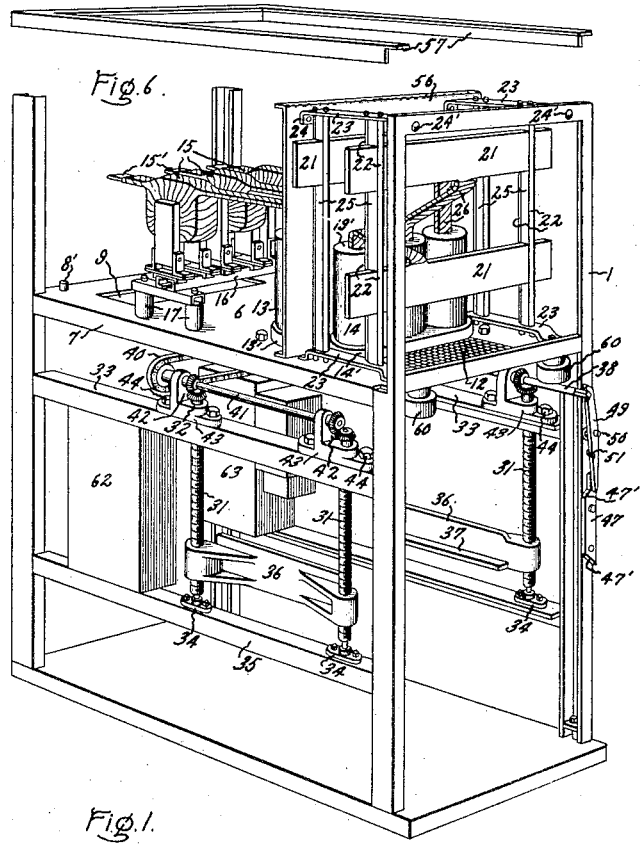
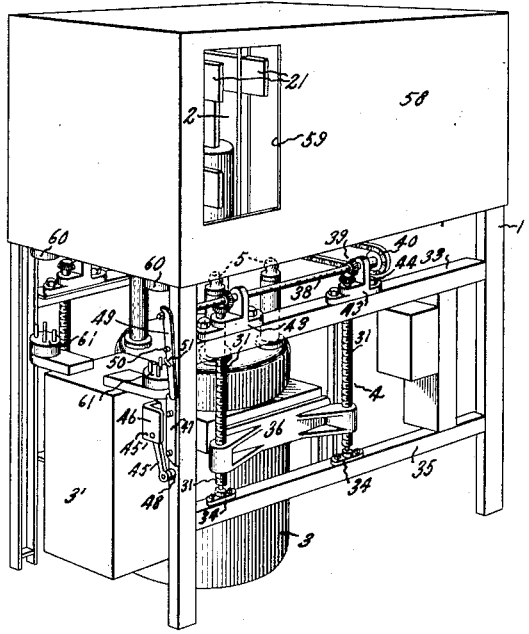
Inventors:
Robert Paxton,
George M. Reed,
Charles H. Hill,
by Harry E. Dunham
Their Attorney.

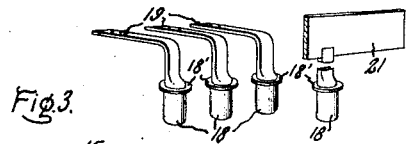
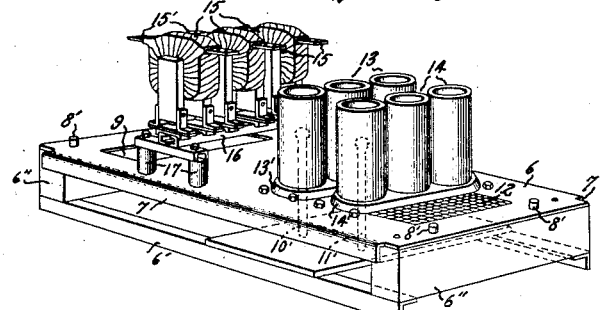
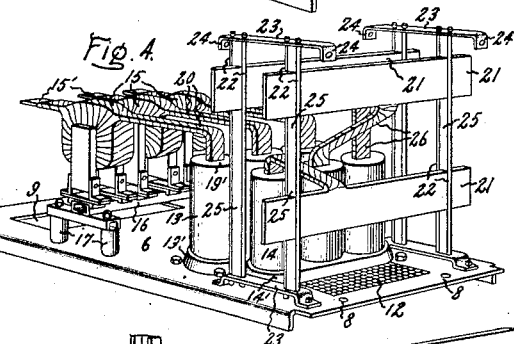
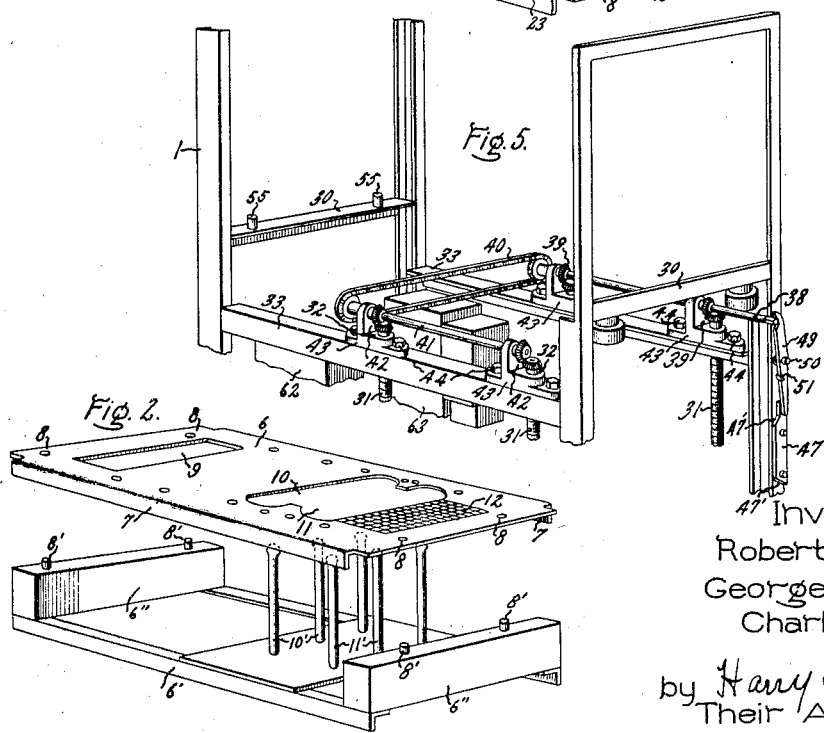
Inventors:
Robert Paxton,
George M. Reed,
Charles H. Hill,
by Harry E. Dunham
Their Attorney.

Patented June 2, 1936

2,043,113

UNITED STATES PATENT OFFICE 2,043,113

METAL ENCLOSED SWITCHGEAR

Robert Paxton, Lansdowne, George M. Reed, Yeadon, and Charles H. Hill, Drexel Hill, Pa., assignors to General Electric Company, a corporation of New York Application September 14, 1933, Serial No. 689,424

6 Claims. (Cl. 175—298)

Our invention relates to metal enclosed switchgear, more particularly to that of the so-called drop-down type wherein a circuit breaker is operatively mounted for vertical movement between connected and disconnected positions with respect to stationary circuit and bus bar structure, and has for its object the provision of improved metal enclosed switchgear of the aforesaid type and an improved method of fabricating the same.

Compactness in design combined with efficiency, accessibility, ease of operation and good appearance, and reduced cost of fabrication have been the objectives of designers of metal enclosed switchgear for some time. Where the switchgear is of the indoor type, the space factor becomes increasingly important as does the accessibility of the apparatus. Low overall height in particular is desirable since the resulting compactness enables the station operator to test, operate, inspect or repair the switchgear more readily.

In accordance with our invention, the stationary busbars and associated parts of the circuit, and the circuit breaker are mounted within a fabricated frame so as to afford a compact, simple and efficient design while affording adequate electrical insulation for the rated voltage, and the apparatus is fabricated and assembled by a simplified, accurate, and improved method which affords considerable saving in time and cost.

Our invention will be more fully set forth in the following description referring to the accompanying drawings, and the features of novelty which characterize our invention will be pointed out with particularity in the claims annexed to and forming a part of this specification.

Referring to the drawings, Fig. 1 is a perspective view of a completely assembled metal enclosed switchgear unit embodying our invention; Fig. 2 is a perspective view of a base plate for a sub-assembly and a fixture on which said base plate is mounted during assembly; Fig. 3 is a detailed, perspective view of a portion of the switchgear illustrating an initial stage of assembly; Fig. 4 is a similar view illustrating a completed sub-assembly; Fig. 5 is a fragmentary view in perspective of a fabricated frame for the switchgear unit, and Fig. 6 is a perspective view showing the sub-assembly unit illustrated in Fig. 4 assembled in the aforesaid frame.

Referring more particularly to Fig. 1, there is illustrated a completely assembled metal enclosed switchgear unit comprising a fabricated metallic frame 1 in which are mounted stationary circuit and busbar structure 2 and an oil circuit breaker unit 3 of suitable interrupting capacity. The circuit breaker 3 is vertically movable within the frame 1, as by elevating means 4 hereinafter described, to connected and disconnected positions with respect to the stationary busbar structure 2 and the circuits associated therewith. In the position shown, the circuit breaker 3 is in its lowered disconnected position wherein the disconnect contacts 5 of the circuit breaker are spaced and isolated with respect to the coacting contacts (not shown) connected to the busbars and associated circuits.

Metal clad switchgear of the so-called dropdown type is well known in the art, the circuit breaker itself being adapted to connect a busbar to a branch circuit as an incoming line or outgoing feeder. When the circuit interrupting contacts (not shown) of the circuit breaker are open, the corresponding branch circuit is disconnected from the bus so that the breaker itself may be isolated with respect to the bus and branch circuit by bodily lowering the same to the position shown in Fig. 1. When the branch circuit is connected to the bus, the circuit breaker unit is elevated so that its disconnect contacts 5 engage the corresponding stationary contacts, after which the contacts of the breaker are closed.

Metal enclosed switchgear units as above described are generally placed in a row and the adjacent corresponding busbar sections interconnected to form a bus and switch station for the desired number of branch circuits.

For a more detailed description of the metal enclosed switchgear unit and the method of fabricating and assembling the same, reference is had to Figs. 2 to 6, inclusive, which illustrate the progressive stages of assembly leading to the completed unit shown in Fig. 1.

During the initial assembly, the stationary circuit structure of the metal enclosed unit including the current transformers, busbar sections and stationary disconnect contacts, is mounted in predetermined position upon a base plate to form a sub-assembly. A fixture on which the base plate is mounted insures accurate positioning of the apparatus. The sub-assembly is then mounted on the supporting frame of the unit so that it assumes a predetermined position therein.

Referring more particularly to Fig. 2, there is shown a base plate 6 formed of sheet steel or other suitable material on which the stationary circuit structure of the sub-assembly is mounted. The base member 6 is turned down at opposite sides to form flanges 7 and is provided with apertures 8 for receiving dowel pins or equivalent positioning members which insure uniform and predetermined positioning of the base member with respect to the fixture and correct alinement of the sub-assembly with respect to the circuit breaker when the base member 6 is mounted in the frame 1.

The base member 6 is first provided with a plurality of apertures in accordance with a template to enable the disconnect contacts of the circuit breaker unit and the outgoing feeder conductors to pass through the base member. One of the aforesaid apertures comprises a rectangular opening 9 through which the incoming or outgoing cables may extend and other openings are formed at 10 and 11 for permitting the circuit breaker disconnect contacts to pass through the base member, a rectangular opening 12 covered with gauze wire likewise permitting passage of circulating air currents through the base member.

The fixture on which the base plate is positioned comprises a member 6' having supporting flanges 6'' at opposite ends thereof on which the base plate rests. Accurate positioning of the base plate on the fixture is insured by dowel pins 8' alined with the apertures 8 in the base plate. A plurality of upright pins 10' and 11' are fixed on the member 6' and positioned so as to extend through the openings 10 and 11 respectively of the base plate 6. These pins function to center and position the stationary disconnect contacts in a manner presently described.

Fig. 3 shows part of the stationary circuit structure mounted on the base plate which in turn is positioned on the fixture above described. The stationary phase disconnect contacts are separately mounted within two groups of cylindrical insulating shells 13 and 14, respectively, each shell open at its lower end for receiving the corresponding movable phase disconnect contact carried by the circuit breaker.

The insulating shells of each group are mounted in a common supporting member 13' and 14', respectively, said supporting members which comprise aluminum castings being properly secured to the base plate 6 from beneath as indicated by bolting to the base member 6. The two groups of insulating shells 13 and 14 are positioned over the pins 10' and 11', respectively, each pin extending into an alined insulating shell.

The current transformers 15 which are usually installed in the feeder circuits are suitably mounted on a common supporting member 16 which is in turn mounted on supports 17. The current transformers are compactly mounted on the base member with respect to the insulating shells 13 and 14 so that the current transformer terminals 15' are in one instance directly over the aperture 9, thereby supporting the leading-out connections of the incoming or outgoing cables, and in the other instance directly in alinement with and in close proximity to the corresponding phase insulating shell.

One group of stationary disconnect socket contacts indicated at 18 are formed integrally with conducting strips 19 respectively for connection to the corresponding terminals of the current transformers. Each contact 18 has suitably secured thereto a mounting disk 18'. As indicated in Fig. 3, these contacts are inserted in the upper ends of the insulating shells 13 and the contacts mounted therein by securing the disks 18' to coacting flanges. The conductors 19 are suitably clamped to the current transformer terminals and the upper ends of the insulating shells 13 are closed and sealed as by an insulating compound 19' so as to insulate the stationary disconnect contacts, the bare conductors being first taped or otherwise insulated as illustrated at 20 in Fig. 4.

For convenience in illustration, but a single phase disconnect contact 18 connected to a busbar 21 is shown in Fig. 3. Each phase busbar section has connected thereto, as indicated in Figs. 3 and 4, a conductor insulated at 26 as by taping and terminating in a stationary disconnect contact mounted and sealed in one of the insulating shells 14 in the manner above referred to.

The arrangement including the disconnect contacts, busbar sections and interconnecting conductors is described with more particularity and claimed in a copending application, Serial No. 689,423, filed concurrently herewith by Charles H. Hill.

In the above assembly the correct positioning of the stationary disconnect contacts 18 with respect to the base member is insured by the upright pins 10' and 11' of the fixture. These pins at the upper ends thereof are engaged by the socket contacts, respectively, as indicated in Fig. 3, each pin corresponding in position to a movable disconnect plug contact of the circuit breaker so as to insure accurate alinement of the stationary disconnect contacts with respect to the circuit breaker.

Fig. 4 illustrates the stage of the assembly wherein the busbar sections and the stationary disconnect contacts integrally connected thereto are added to the unit. The three phase busbar sections 21 are rigidly mounted in position on the base 6 subsequent to mounting of the associated disconnect contacts 18 in the insulating shells 14. In the present arrangement the busbar sections are positioned (referring to cross-section) generally at the points of a right triangle, two busbar sections being at the same level and a third busbar section being vertically spaced beneath the upper and outer busbar section. For the purpose of rigidly positioning and maintaining said busbar sections in the aforesaid parallel arrangement, each section is clamped adjacent each end thereof between a pair of insulating rods 22 which are in turn supported and braced by metallic strips 23. The lower strip 23 is suitably secured as by bolting to the base member 6, and the upper strip is provided with fastening lugs 24 for attachment to the main supporting frame as hereinafter described. The rods 22 are separated by insulating spacers 25 which are grooved at the opposite edges thereof so as to be locked in position by the insulating rods. The busbar mounting and bracing arrangement above described forms no part of the present invention and is described and illustrated with more particularity and claimed in Hill et al. Patent 1,902,501 for Bus bar structure, granted March 21, 1933.

The busbar and disconnect structure is preferably assembled and incorporated in the base structure, as indicated in Fig. 3, previous to mounting of the busbar supporting and bracing rods thereon. The sub-assembly unit including the busbars and associated stationary parts of the circuit is now essentially complete since the circuit between each busbar section and its corresponding current transformer and branch circuit terminal is complete except for the bridging connection between the stationary disconnect contacts which is effected by the circuit breaker itself.

Fig. 5 illustrates the main supporting frame 1 which is suitably fabricated as by structural members 30 to form a metallic skeleton, box-like in shape. The frame has mounted therein and supports, as illustrated in Fig. 1, the circuit breaker and is constructed, together with the elevating and supporting mechanism 4 for the circuit breaker, independently of the sub-assembly illustrated by Fig. 4.

The circuit breaker elevating and supporting mechanism and frame in fact constitute a separate sub-assembly comprising four jackscrews 31 arranged in the form of a rectangle, each jackscrew being journaled, as at 32, in a cross-member 33 of the frame. The lower end of each jackscrew (Fig. 6) is mounted in a bearing member 34 likewise on a cross-member 35. The jackscrew bearings are located in the frame by jigs or suitable positioning means so that the bearings for each jackscrew not only insure parallelism with respect to the other jackscrews, but provide for predetermined positioning of the circuit breaker within the frame.

The pair of jackscrews on each side of the frame are arranged to elevate and lower a supporting member 36 which is in turn provided with a flange 37 for supporting the circuit breaker 3. The supporting members 36 engage the circuit breaker as illustrated at opposite sides thereof so that simultaneous and uniform rotation of the jackscrews causes corresponding vertical movement of the circuit breaker. Uniform movement of the jackscrews 31 may be obtained in any desirable manner as by the main operating shaft 38 coacting with one pair of jackscrews through bevel gearing 39, and with the other pair of jackscrews through the sprocket chain 40, countershaft 41 and bevel gearing 42. The shaft 38 extends beyond the frame and is provided with a squared end portion for cooperation with manual operating means as a socket crank for example. The shaft 38 may obviously be motor-operated, if desired. The bearing members 43 which are common to the jackscrews and main and counter shafts are secured as by bolts 44 to the cross-members 33.

Interlocking of the circuit breaker with respect to the frame and elevating mechanism is accomplished in the present instance by relating the circuit breaker tripping means to cam means carried by the frame and to means for blocking operation of the operating shaft 38. The tripping mechanism (not shown) of the circuit breaker (Figs. 1 and 5) is operatively connected to a lever 45 pivoted at 45' on a bracket or support 46 carried by the circuit breaker operating mechanism unit 3'. The lever 45 is normally biased towards the adjacent frame upright, movement of the lever in the opposite direction causing tripping of the breaker.

The sequence of interlocking is well known, the breaker being tripped prior to or concurrent with initial downward movement of the circuit breaker from connected position, and tripped, in the event that it has been closed while in disconnected position, so that the circuit breaker is open when elevated to connected position. Accordingly, there is provided a cam plate 47 secured to the frame 1 having beveled edges 47' at opposite ends thereof, said edges arranged in the normal vertical path of a roller 48 carried at the end of the lever 45. When the breaker is in connected or disconnected position the roller 48 is free of the cam plate 47, movement of the breaker however to the opposite position causing camming inwardly of the roller by a coacting edge 47' and tripping of the breaker. Accordingly the breaker is "locked out" while being lowered or elevated between the aforesaid positions.

Blocking of the operating shaft when the circuit breaker is elevated and closed is accomplished by a member 49 pivoted at 50 on the frame 1 and normally biased, as by spring 51, so that the upper end engages the shaft 38 as illustrated. When in this position a socket crank cannot engage shaft 38 to operate the same. Movement of the member 49 clockwise to unblock the operating shaft causes tripping of the breaker, the lower end of member 49 engaging the roller 48 to move trip member 45 inwardly.

Referring to Fig. 6, the next stage of assembly is illustrated wherein the sub-assembly unit illustrated in Fig. 4 is incorporated in the frame structure shown by Fig. 5. It will be noted that, referring to Fig. 5, the frame 1 in the present instance is provided with dowel pins 55 mounted on transverse members 30 so as to aline with the apertures 8 of the base member 6. That is, the dowel pins exactly correspond in position to those on the fixture shown in Fig. 2. Accordingly, when the sub-assembly is lowered and mounted within the frame 1 so as to be positioned by the dowel pins 55, the stationary disconnect contacts within the groups of insulating shells 13 and 14 bear a predetermined fixed and proper relation to the frame so that no adjustment between the circuit breaker unit and stationary disconnect contacts is necessary. It will be apparent of course that bolt holes in lieu of dowel pins may be similarly located in the frame, the base plate 6 in this case being bolted to the frame.

After the sub-assembly is positioned as illustrated in Fig. 6, the conductors leading to the groups of insulating shells 13 and 14 respectively are isolated from each other as by a sheet metal partition 56 which is secured at its lower end to the base member 6 and at its upper end to the busbar supporting strips 23 which are, in turn, secured at 24' to upright members of the frame by means of the lugs 24.

The skeleton of the supporting frame is completed by the angular members 57 which are suitably secured to the upper ends of the four vertical uprights of the frame. The final stages of assembly include mounting the circuit breaker unit on the supporting members 36 within the frame and enclosing by a metallic housing the stationary sub-assembly unit within the upper part of the frame. As illustrated in Fig. 1, the completed metal-clad unit comprises an upper enclosing housing 58 formed by sheet metal sections suitably secured to the four sides and top of the upper portion of the frame. Another contemplated arrangement comprises a sheet metal enclosing housing mounted on the upper part of the frame which in this case does not extend appreciably above the circuit breaker. The opposite side walls of the metallic housing are provided with apertures 59 so that the busbar sections 21 may be joined to corresponding sections of an adjacent metal-clad unit.

The circuit breaker unit 3 may be of any suitable type for interrupting large amounts of power and, as shown, is an oil circuit breaker of well-known design comprising a steel tank containing oil in which the circuit interrupting apparatus is immersed. The three phases of the circuit breaker include a pair of lead-in conductors for each phase, the upper ends of said lead-in conductors having connected thereto the disconnect contacts 5 previously referred to.

As illustrated in Fig. 4, each phase includes a pair of insulating shells 13 and 14 mounted in proper alinement with respect to the corresponding pair of conductor studs and disconnect contacts of the circuit breaker 3, the lower ends of the insulating shells being open so as to receive upon elevation of the circuit breaker the disconnect contacts 5 for engagement with the stationary disconnect contacts. In the connected position described, each phase busbar section is connected to its corresponding feeder cable through the aforesaid disconnect contacts, oil circuit breaker contacts and current transformer.

The secondary disconnect contacts for the conventional low voltage control circuits associated with the breaker mechanism, etc. comprise coacting plug and socket connections, as relatively stationary socket members 60, mounted on and beneath the metallic housing 58 and coacting plug member 61 mounted on the circuit breaker mechanism 3' in vertical alinement with the stationary members 60. Accordingly, when the circuit breaker is elevated to its operative connected position, the control circuits for tripping the breaker mechanism, etc., are completed. The control apparatus including relays, etc., forms no part of the present invention and is mounted in housings 62 and 63 supported by the frame 1.

It should be understood that our invention is not limited to specific details of construction and arrangement thereof herein illustrated, and that changes and modifications may occur to one skilled in the art without departing from the spirit of our invention.

What we claim as new and desire to secure by Letters Patent of the United States, is:

1. A metal-clad bus and switch unit comprising a stationary supporting frame, and a base plate on which are mounted phase current transformers, stationary disconnect contacts and busbar sections forming with said base plate a sub-assembly, said base plate mounted on said frame and positioned by dowel pins so as to bear a predetermined space relation to said frame.

2. A metal-clad bus and switch unit comprising a stationary supporting frame, a base plate on which phase current transformers, stationary disconnect contacts and bus bar sections are mounted to form with said base plate a sub-assembly, means positioning said sub-assembly as a unit on said frame so that said sub-assembly bears a predetermined fixed space relation to said frame, and means guiding a circuit breaker for vertical movement within said frame so as to be in predetermined alinement with respect to said sub-assembly.

3. A metal-clad bus and switch unit comprising a supporting frame, a base plate having mounted thereon phase current transformers, stationary disconnect contacts, bus bar sections and a metallic isolating barrier between the portions of the circuits associated with the bus bars and with the current transformers, respectively, to form with said base plate a sub-assembly, means positioning and securing said base plate at the upper part of said frame so that said sub-assembly bears as a unit a predetermined fixed space relation to said frame, circuit breaker elevating mechanism mounted within said frame beneath said sub-assembly including a plurality of jackscrews having a common operating member accessible at one side of said unit, and metal enclosing plates forming with said base plate and isolating barrier a bus bar compartment and a current transformer compartment.

4. In electrical switchgear including a circuit breaker movable bodily between connected and disconnected positions with respect to stationary circuit and busbar structure and elevating means for said breaker including a manually operated shaft, means interlocking said breaker with respect to said shaft comprising a member carried by said circuit breaker and cooperating with the tripping mechanism thereof, and a blocking member coacting with the operated end of said shaft, said blocking member normally biased to blocking position and arranged to actuate said tripping member when moved to unblocking position.

5. A metal clad bus and switch unit of the drop-down type comprising a stationary supporting frame, a movable circuit breaker, a base plate on which phase busbar sections, stationary disconnect contacts and associated electrical apparatus are mounted to form with said base plate a sub-assembly, a plurality of jackscrews for elevating and lowering said circuit breaker mounted in said frame in predetermined relation thereto to form a second sub-assembly, and means for positioning said first-named sub-assembly as a unit on said frame so as to bear a predetermined fixed space relation to said second sub-assembly.

6 A metal clad bus and switch unit comprising a stationary supporting frame, a circuit breaker arranged to be supported in said frame, a base plate on which phase stationary disconnect contacts and associated electrical apparatus and conductors are mounted to form with said base plate a sub-assembly, means positioning said sub-assembly as a unit on said frame so that said sub-assembly bears a predetermined fixed space relation to said frame, and means guiding said circuit breaker for vertical movement within said frame between connected and disconnected positions with respect to said stationary disconnect contacts so as to be in predetermined alinement with respect to said sub-assembly.

ROBERT PAXTON.
GEORGE M. REED.
CHARLES H. HILL.